No. 649,537. Patented May 15, 1900.
E. DUBOIS.
MACHINE FOR MAKING CIGARS.
(Application filed Oct. 6, 1899.)
(No Model.) 3 Sheets—Sheet 1.
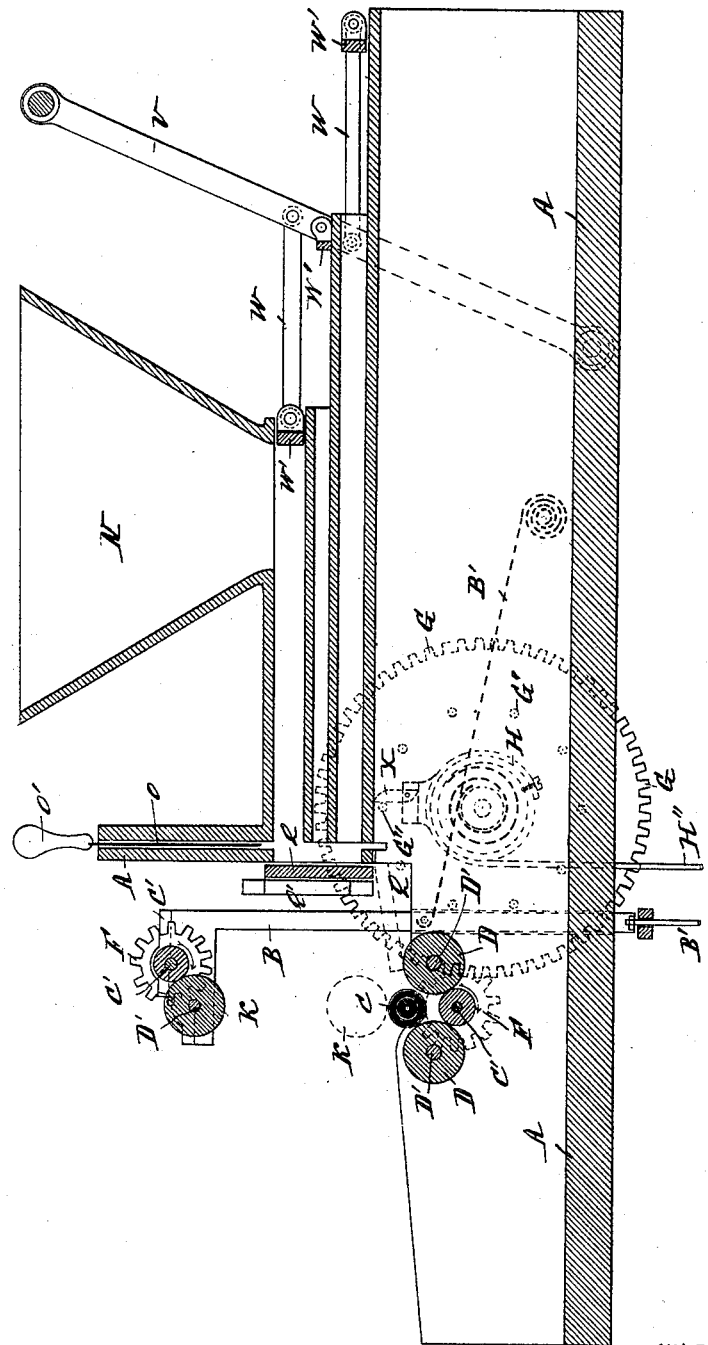
WITNESSES:
Ella L. Giles
INVENTOR
Edmond Dubois
BY
ATTORNEYS No. 649,537. Patented May 15, 1900.
E. DUBOIS.
MACHINE FOR MAKING CIGARS.
(Application filed Oct. 6, 1899.)
(No Model.) 3 Sheets—Sheet 2.
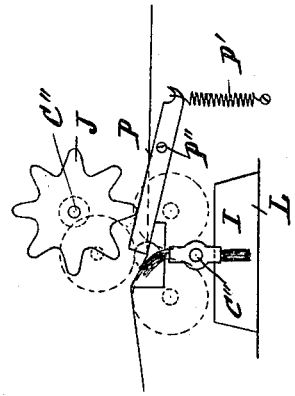
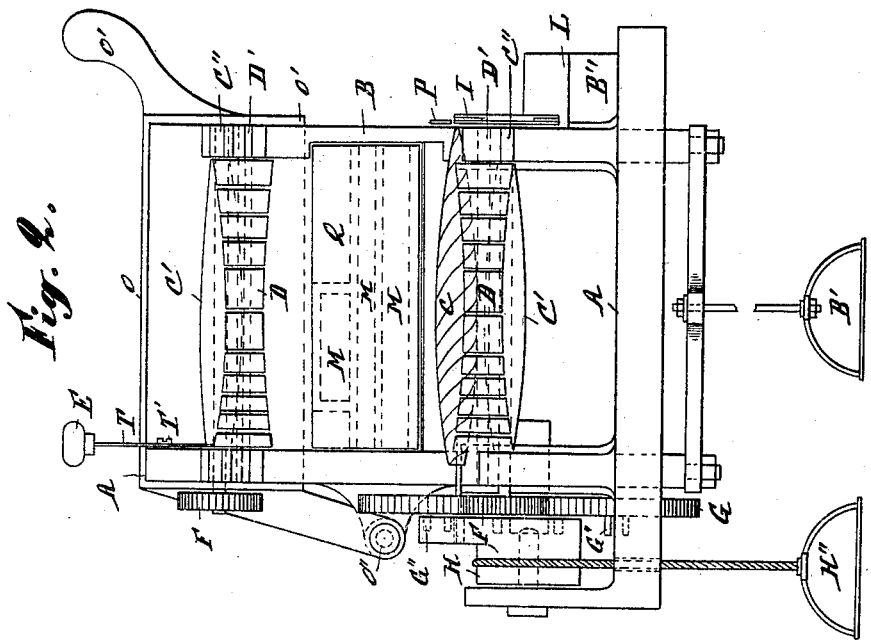
WITNESSES:
Ella L. Giles
Oldmunk
INVENTOR
Edmond Dubois
BY
Richardson
ATTORNEYS No. 649,537. Patented May 15, 1900.
E. DUBOIS.
MACHINE FOR MAKING CIGARS.
(Application filed Oct. 6, 1899.)
(No Model.) 3 Sheets—Sheet 3.
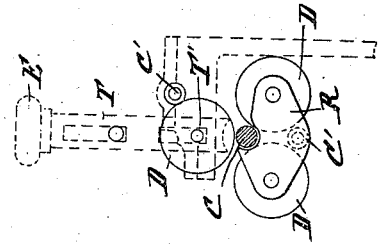
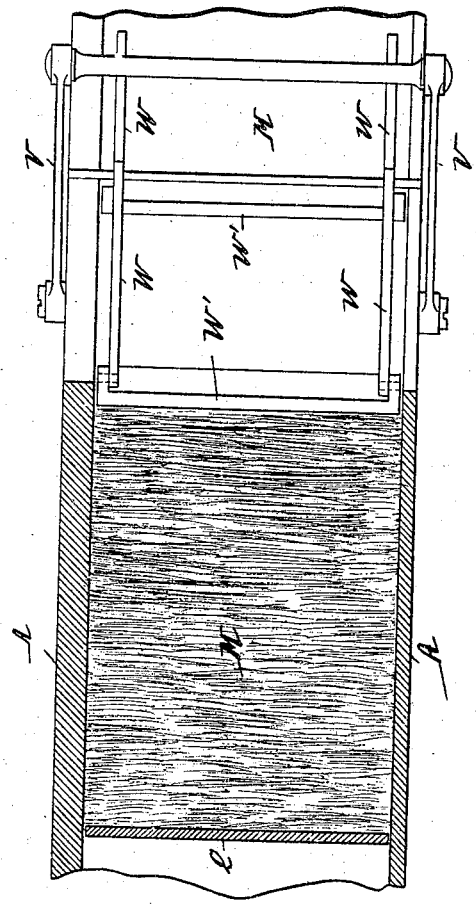
WITNESSES:
Ella L. Giles
Oldmmnk
INVENTOR
Edmond Dubois
BY
Richardm
ATTORNEYS

UNITED STATES PATENT OFFICE.

EDMOND DUBOIS, OF BRUSSELS, BELGIUM.

MACHINE FOR MAKING CIGARS.

SPECIFICATION forming part of Letters Patent No. 649,537, dated May 15, 1900.

Application filed October 6, 1899. Serial No. 732,857. (No model.)

*To all whom it may concern:*

Be it known that I, EDMOND DUBOIS, mechanician, a subject of the King of Belgium, residing at 102 Rue du Marais, Brussels, in the Kingdom of Belgium, have invented new and useful Improvements in Machines for Making Cigars, (for which applications were filed in France on September 4, 1899; in Italy on September 4, 1899; in Switzerland on September 5, 1899; in England on September 5, 1899; in Luxemburg on September 5, 1899, granted September 5, 1899, No. 3,726; in Hungary on September 9, 1899, and in Austria on September 12, 1899,) of which the following is a full, clear, and exact description.

This invention has for its object a machine for making cigars which works in such a way as to form first the interior of the filler and then to immediately wrap the latter in the wrapper-leaf by means of the same mechanical parts.

In the accompanying drawings, Figure 1 is a longitudinal section; Fig. 2, a front view; Fig. 3, a partial plan view with a horizontal section of the upper tobacco-drawer of the machine. Fig. 4 is a front view of the arrangement of knife for cutting the end of the cigar. Fig. 5 represents a front view of the mechanism for cutting the leaf to a point and shows the gumming-brush.

On the frame or table A three tobacco-compartments M are superimposed horizontally, the upper one of which is provided with a hopper N for the introduction of short tobacco. In the middle compartment a layer of tobacco-leaf of uniform quality is introduced by the rear end, and into the lower compartment a leaf of better or superior quality, but in such a way that the leaves are not placed longitudinally, but transversely, in the compartments, as shown in Fig. 3. The compression of the leaves in transverse position in the compartments is effected by presser-bars or plungers W', which, guided on the ends of the compartments, are connected by links W with a lever V, which pivots on the frame or table A and on which it is sufficient to exert any suitable pressure in order to compress sufficiently the leaves of tobacco against a valve Q, arranged in front of the other ends of the compartments. The valve Q is located in such a way that the portion of tobacco compressed projects beyond the end of the compartments to a given extent, so as to be capable of being separated from the remainder by the action of a cutter o in order to be then directed by the valve (which is then turned down in an inclined position, as shown in dotted lines in the drawings) toward a series of rolling-cylinders arranged behind the compartments in such a way that the workman may have access to the portion of internal tobacco or filler cut up in the longitudinal direction of the leaves in order to arrange the said filler on the wrapper-leaf placed in the rolling-cylinders D, which are mounted parallel to this direction in such a way that the short tobacco is held in the midst of the filler, which is then completed by the rolling of the whole between the cylinders.

The cutter o, serving to separate or cut the portion of tobacco which is pressed against the portion of the valve Q by the plungers or presser-bars W', is fixed to a frame B, guided vertically in the frame A and held normally in its uppermost position by strong springs B', while in order to effect the cutting it is lowered by the foot of the workman being placed in a stirrup fixed at the lower end of the frame, which then descends with a knife and cuts off a portion of tobacco corresponding to a filler. Further, the cutter o pivots on its frame B, so that any cutting which may be imperfectly made on the lowering of the frame can eventually be completed by the workman operating the cutter by the handle O'.

Slides Q', applied to the frame B, serve to maintain in position the valve Q during the compression and cutting of the tobacco, as during this operation it is pressed against the slides, while after the cutting has been finished the valve turns down over the slides, which thus also serve to raise the valve into its normal position when they rise with the frame.

The series of rolling-cylinders are arranged on the frame A similarly to the arrangement for preparing the fillers. This set of rollers consists, essentially, of three cylinders of special construction, two of which, D, are arranged in a stationary position in a transverse direction to the frame in front of the valve Q, which delivers to them the portions of tobacco prepared in the compartments M for forming the fillers, while the third cylinder K is arranged at the summit of the frame B, carrying the slides Q' in such a way as to be raised and lowered with the latter at will and in the manner hereinbefore described by means of the workman's foot. Each of these three cylinders is formed of several truncated sections distributed symmetrically from the center to the extremities of each cylinder, so as to together form perimetral lines conforming to the shape to be given to the cigar. These conical sections or rollers are not rigid with the spindles D' of the cylinders; but they revolve freely and loosely on the said spindles under the action of the friction exerted thereon by india-rubber rollers C', corresponding exactly to the form of the external lines of the rolling-cylinders—that is to say, having the form of the cigar C, which is to be manufactured between the rolling-cylinders—one being situated between the two lower rolling-cylinders in the frame A and the other against the upper rolling-cylinder K in the frame B.

The india-rubber cylinders C' are rotated by means of pinions F, keyed on their axes, which pinions when the frame B is lowered by the pressure of the workman's foot are both in gear with a large spur-wheel G, which sets them in rotation in the same direction. The spur-wheel G is driven by means of a barrel H, revolving freely on the shaft of the toothed wheel G and on which is wound a cord H', fixed to a stirrup H'', adapted to be lowered by the foot of the workman, said barrel carrying a pawl x, which engages studs G'' on the large toothed wheel for setting in rotation the rolling-cylinders when the stirrup is depressed, while the pawl yields or slips under the studs when the stirrup is released for winding up the cord, so that the toothed wheel then remains stationary. Of course this is only an example of the method of operating, seeing that the friction-cylinders may be operated according to requirements and in any other suitable manner.

The rolling-cylinders composed of several rollers having an external formation coinciding with the form of the cigar to be made and capable of rotating on a common axis independently one of another have the advantage of avoiding the drawbacks resulting from variable or different speeds in the perimeters of cylinder-machines in general, because the perimetral speed of each of the sections or rollers corresponds exactly to the speeds of different parts of the perimeter of the cigar in rotation, so that no irregularity or tearing of the wrappers can be produced during the rolling. For cutting the wrapper-leaf at the point of the cigar a knife P is applied in front of the point, said knife pivoting at P'' under the pull of a tension-spring P' at the one end and intermittent depressions exerted by a multiple cam J on the other end and also a rotary brush I, which coats the leaf lightly with gum, said brush turning around the end C'' of the axis of the lower india-rubber cylinder, while the cam J turns with the axis C'' of the upper india-rubber cylinder C', as shown in detail in front view in Fig. 5. The other end of the cigar is cut off by a knife T, which is guided in tenons T', fixed to the frame B, the upper end of the knife having a knob E to enable it to be handled.

The working of the machine may be easily deduced from the preceding description. After having arranged the tobacco in the compartments M in the manner described and having compressed it against the valve Q by means of the plungers or presser-bars W', operated by the lever V, the workman places the wrapper of the filler on the lower cylinders D and depresses the stirrup B' with his foot, thus cutting off the portion of tobacco in front of the valve (which latter places it on the said wrapper) and pressing down and imprisoning the whole between the three cylinders D D D. Then the workman depresses once or twice the stirrup H'', thus setting the system in rotation, as hereinbefore described, and finishing the filler between the rolling-cylinders. Then the same filler (or even a certain quantity of fillers thus prepared in advance) may be wrapped by the same mechanism of cylinders and in the manner hereinbefore described, the cigars being finished by the cutter arrangements hereinbefore mentioned.

I claim as my invention—

1. In combination in a cigar-making machine, rolling mechanism and feeding mechanism comprising a series of compartments adapted to receive tobacco of different grades, means for feeding the tobacco from the several compartments to a common point, means for severing a predetermined quantity of the tobacco and means for conveying the same to the roller mechanism, substantially as described.

2. In combination, a series of compartments, a pusher adapted to be reciprocated in each compartment, a removable backing-plate adapted to receive the pressure of said pusher to compress the tobacco, means for severing a predetermined quantity of the compressed tobacco, rolling mechanism and means for withdrawing said backing-plate and conveying the severed tobacco to the rollers.

3. In combination, a plurality of compartments pushers working therein, a backing-plate, means for holding the same in place, rolling mechanism normally out of operation and means for bringing said mechanism into operation and removing the support for said backing-plate, said plate conveying the tobacco to said rollers.

In witness whereof I have hereunto set my hand in presence of two witnesses.

EDMOND DUBOIS.

Witnesses:
AUG. JOERISSEN,
GREGORY PHELAN.